(12) United States Patent
Matsuzawa

(10) Patent No.: US 7,124,378 B2
(45) Date of Patent: Oct. 17, 2006

(54) MATERIAL ESTIMATION APPARATUS, MATERIAL ESTIMATION PROGRAM AND METHOD OF ESTIMATING MATERIALS

(75) Inventor: Kazuya Matsuzawa, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 89 days.

(21) Appl. No.: 10/375,354

(22) Filed: Feb. 28, 2003

(65) Prior Publication Data
US 2003/0163793 A1 Aug. 28, 2003

(30) Foreign Application Priority Data
Feb. 28, 2002 (JP) ............................. 2002-054673

(51) Int. Cl.
*G06F 17/50* (2006.01)
(52) U.S. Cl. ............................................. 716/4; 716/1
(58) Field of Classification Search .................... 716/4, 716/1, 5; 703/13, 18
See application file for complete search history.

(56) References Cited

OTHER PUBLICATIONS

Scott et al.,"A Transmission Line Model for Silicided Diffusion: Impact on the Performance of VLSI Circuits", Apr. 1982, IEEE Journal of Solid-State Circuits, vol. 17, iss. 2, pp. 281-291.*

Apte et al.,"An Integrated Approach for Accurate Simulation and Modeling of the Silicide-Source/Drain Structure and the Silicid Diffusion Contact Resistance", Dec. 1998, IEDM '98 Technical Digest, International Electron Device Meeting, pp. 729-732.*

Brn G. Streetman,"Solid State Electronic Devices", 2$^{nd}$ edition, 1980, Prentic-Hall, Inc., pp. 136-161.*

Bing-Yue Tsui, et al., "Impact of Silicide Formation on the Resistance of Common Source/Drain Region", IEEE Electron Device Letters, vol. 22, No. 10, Oct. 2001, pp. 463-465.

W. Fichtner, et al.,"TCAD Software for ESD On-Chip Protection Design", Technical Digest, International Electron Devices Meeting, Dec. 2-5, 2001, (5 pgs.).

Pushkar P. Apte, et al., "An Integrated Approach for Accurate Simulation and Modeling of the Silicide-Source/Drain Structure and the Silicide-Diffusion Contact Resistance", Technical Digest, International Electron Devices Meeting, Dec. 2-5, 2001, (3 pgs.).

* cited by examiner

*Primary Examiner*—Sun James Lin
(74) *Attorney, Agent, or Firm*—Oblon, Spivak, McClelland, Maier & Neustadt, P.C.

(57) ABSTRACT

A material estimation apparatus which estimates physical properties of an object including two materials contacting each other by performing a simulation for the object, comprising: a transition area setting part which sets a virtual transition area to a contact portion between the two materials; and a power calculation unit which calculates consumption power due to a contact resistance of the transition area based on potential difference of the transition area.

18 Claims, 14 Drawing Sheets

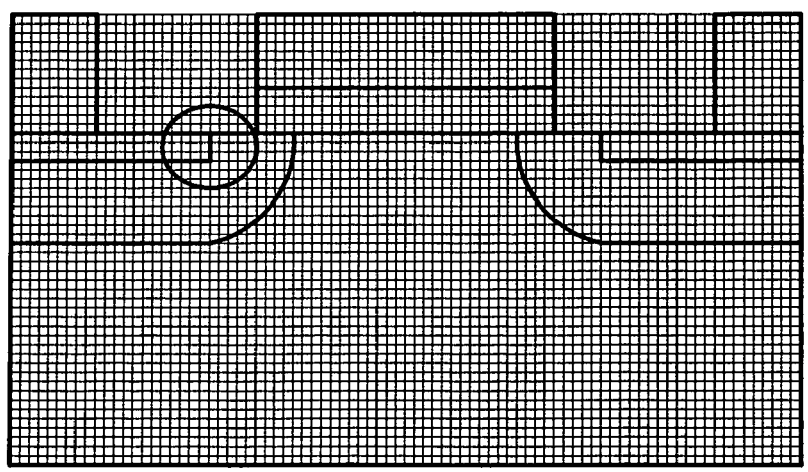
F I G. 2

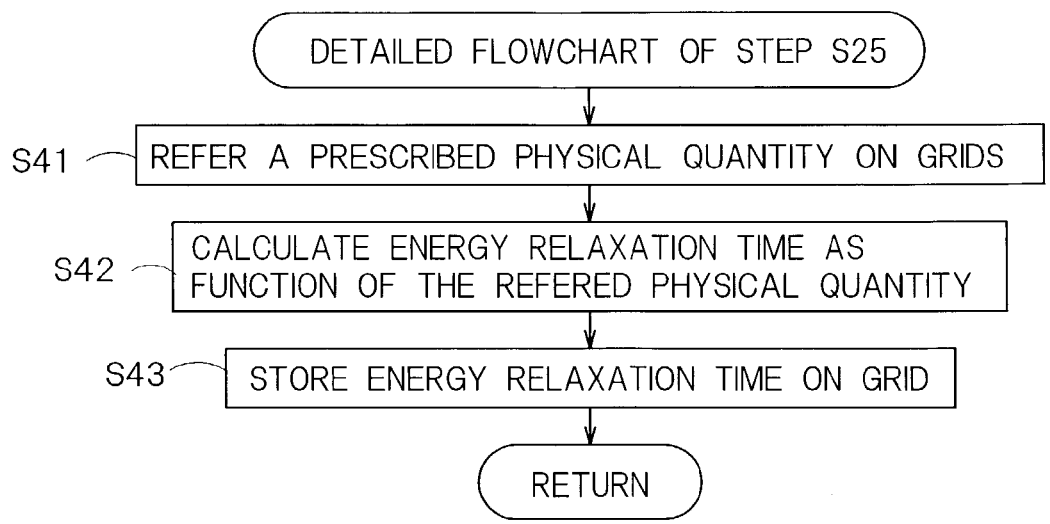
F I G. 11
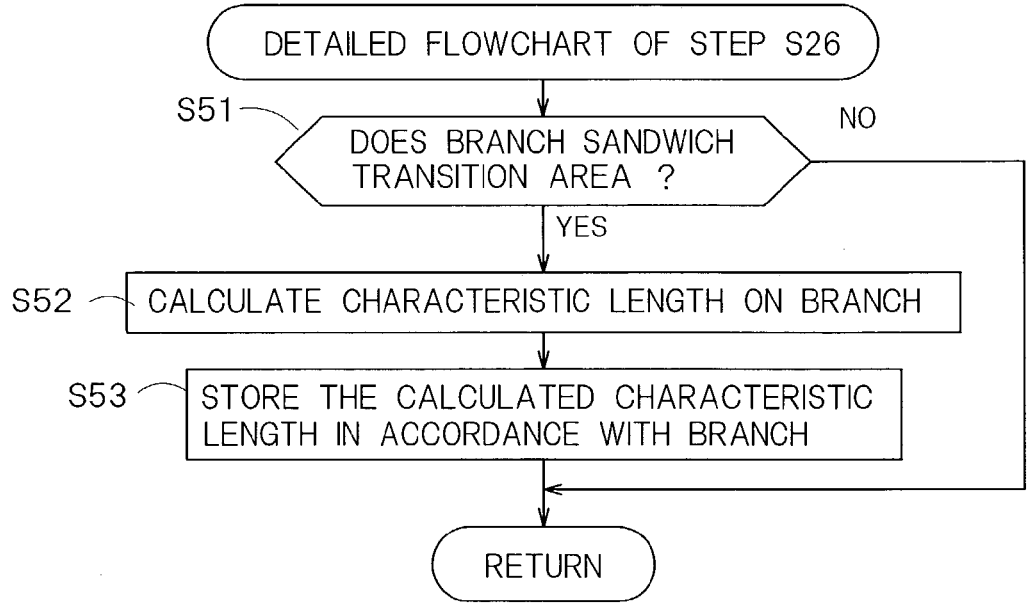
F I G. 12

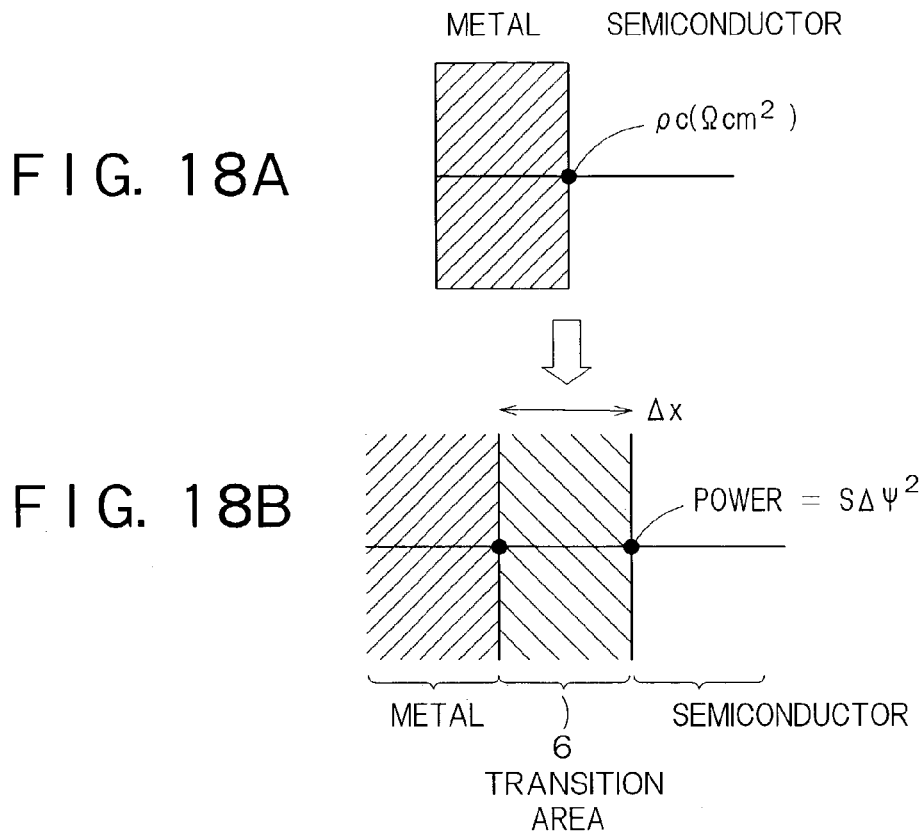
FIG. 18A
FIG. 18B
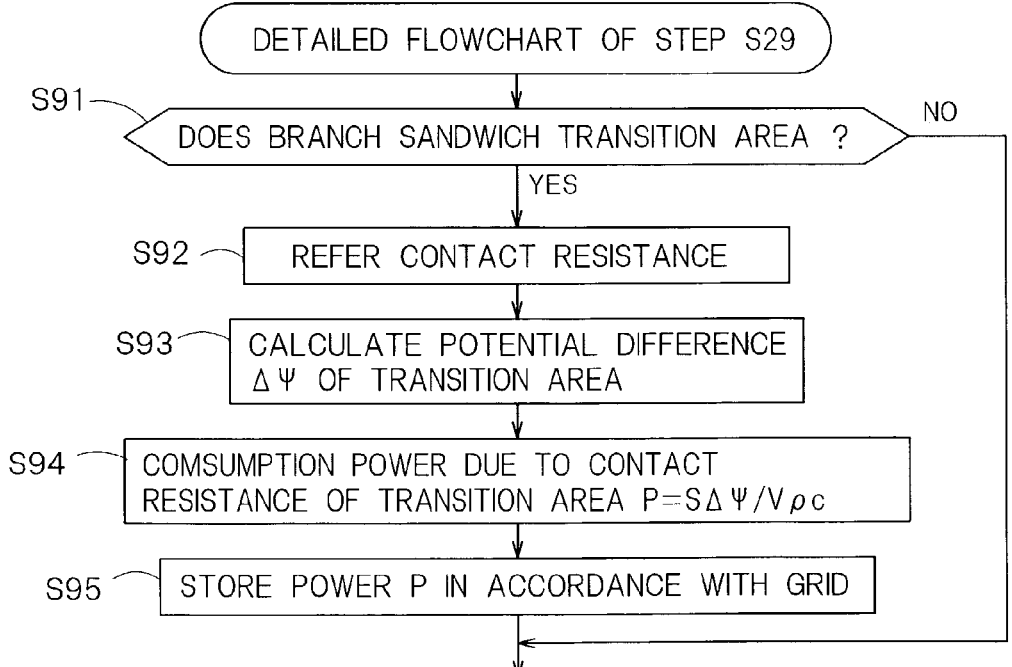
FIG. 19

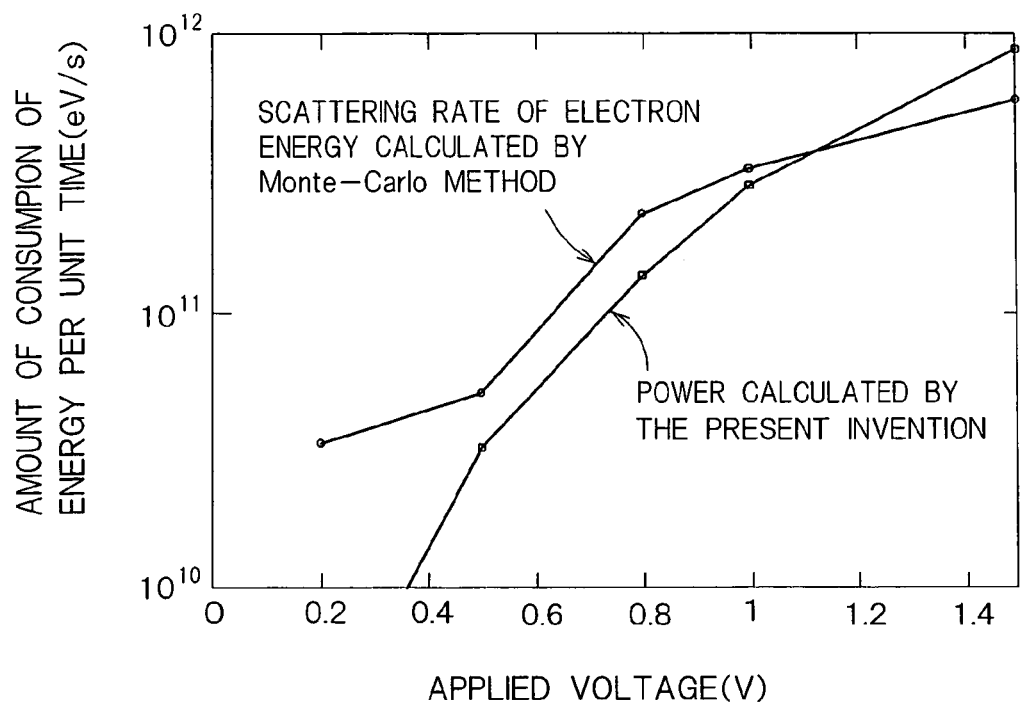
F I G. 20

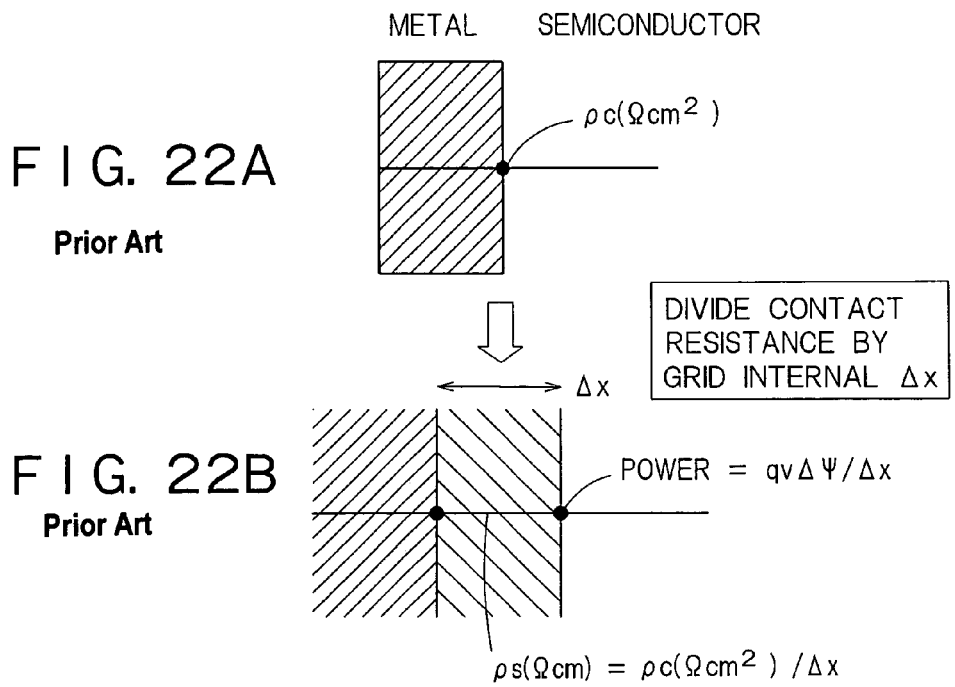
FIG. 22A Prior Art
FIG. 22B Prior Art
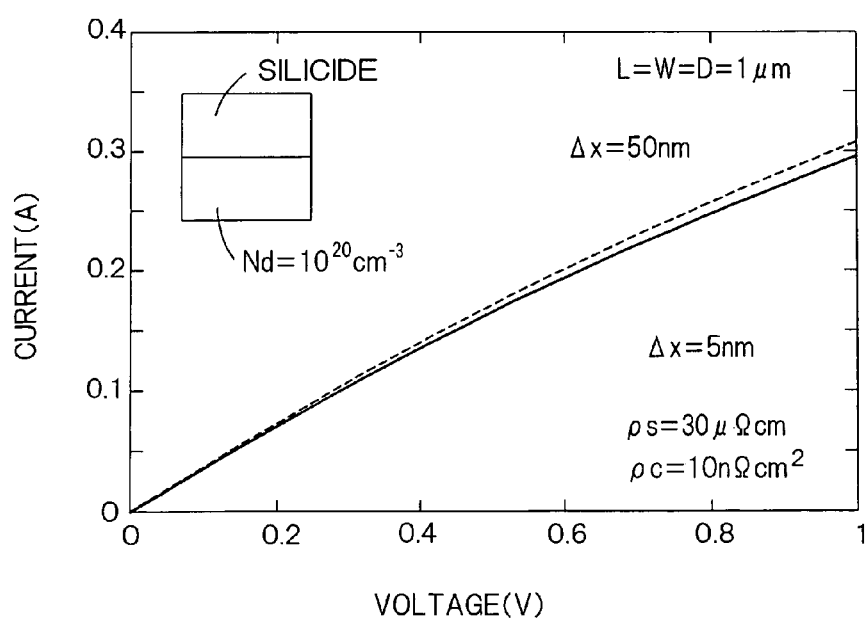
FIG. 23 Prior Art

MATERIAL ESTIMATION APPARATUS, MATERIAL ESTIMATION PROGRAM AND METHOD OF ESTIMATING MATERIALS

CROSS REFERENCE TO RELATED APPLICATIONS

This application is based upon and claims the benefit of priority from the prior Japanese Patent Applications No. 2002-54673, filed on Feb. 28, 2002, the entire contents of which are incorporated herein by reference.

BACKGROUND OF THE INVENTION

1. Field of the Invention

The present invention relates to a material estimation apparatus, a material estimation program and a method of estimating materials which estimates physical properties of objects while taking a contact resistance into consideration.

2. Related Background Art

A device simulation is inevitable for effective design of LSIs. It is necessary for the device simulation to incorporate various phenomenons in a semiconductor device as a part of an estimation system. There is a contact resistance as one of the phenomenons.

FIG. 1 shows a typical cross sectional view of an insulated gate transistor (hereinafter, called as a MISFET). There is a contact portion between a metal and a semiconductor in most of the semiconductor devices. In the case of FIG. 1, a surface between a source silicide and a source diffusion layer, and a surface between a drain silicide and a drain diffusion layer correspond to contact portions. The contact resistance occurs in these contact portions. The contact resistance causes current drop and heat generation.

In the conventional technique, the simplest method taking the contact resistance into consideration is to provide an external resistor connected to a terminal electrode as shown in FIG. 21. In this method, it is impossible to take into consideration influences of potential drop due to the contact resistance in the device and heat generation.

As a method of performing simulation by importing the influence of the contact resistance in the device, there is a method as shown in FIG. 22. That is, the value of the contact resistance $\rho c$ indicated by user or automatically calculated is converted into the electric resistivity $\rho s$. That is, a grid interval $\Delta x$ is provided between the metal and the semiconductor. The electric resistivity $\rho s$ obtained by dividing the value $\rho c$ of the contact resistance by the grid interval is set to the grid interval.

According to this method, even if the grid interval $\Delta x$ changes, the amount of the current is hardly affected as shown in FIG. 23. The reason is because the electric resistivity $\rho s$ is set in accordance with the grid interval $\Delta x$ so that the potential difference at the contact portion hardly changes, even if the grid interval $\Delta x$ changes, as shown in FIG. 24. In FIG. 24, the voltage difference is $\Delta\phi 1$ in the case of the grid interval $\Delta x=5$ nm, and the voltage difference is $\Delta\phi 2$ in the case of the grid interval $\Delta x=50$ nm. As shown in FIG. 24, even if the grid interval changes, it turns out that the voltage difference is almost equal.

Thus, even in the conventional technique, without being affected on the grid interval, it is possible to perform the simulation which allows the value of the contact resistance to reflect to the amount of the current.

However, according to the method of FIG. 22, there is a problem in which the amount of the heat generation due to the contact resistance depends on the grid interval.

FIG. 25 shows grid temperature distribution in the substrate surface portion of a MISFET. Grid temperature in a contact portion between the silicide and the diffusion layer changes in accordance with the grid interval. The reason is because the value of electrical field is different from each of the grid intervals affected by the contact resistance.

More specifically, in FIG. 25, when the grid interval affected by the contact resistance is $\Delta x$, and the voltage difference is $\Delta\phi$, $\Delta\phi$ does not largely change depending on $\Delta x$. However, consumption power in the contact portion between the silicide and the diffusion layer is calculated by the current density J and the electric field E, and the electric field E is given by $(-\Delta\phi/\Delta x)$. Because of this, even if $\Delta\phi$ is constant, if $\Delta x$ is different, the consumption power is different from each other. As a result, the difference of the grid temperature distribution appears, as shown in FIG. 25.

Thus, conventionally, even if the simulation is performed while taking the contact resistance into consideration, the results of the simulation relating to the grid temperature differs in accordance with the grid interval, and the prediction result of tolerance such as breakdown due to heat generation of the contact resistance portion also changes in accordance with the grid interval.

SUMMARY OF THE INVENTION

A one of objects of the present invention is to provide a material estimation apparatus, a material estimation program and a method of estimating materials capable of precisely performing simulation relating to grid temperature in accordance with grid interval regardless of length of the grid interval.

According to the present invention, a material estimation apparatus which estimates physical properties of an object including two materials contacting each other by performing a simulation for the object, comprising:

a transition area setting part which sets a virtual transition area to a contact portion between said two materials; and a power calculation unit which calculates consumption power due to a contact resistance of said virtual transition area based on potential difference of said virtual transition area.

Furthermore, a material estimation apparatus which estimates physical properties of an object including two materials contacting each other by performing a simulation for the object, comprising:

a transition area setting part which sets a virtual transition area to a contact portion of said two materials; and a power calculation unit which calculates consumption power due to a contact resistance of said virtual transition area based on a potential difference due to the contact resistance of said virtual transition area, a characteristic length expressing a width of a depletion layer or a value in proportion to the width formed when said two materials contact each other, an energy relaxation time expressing an average time when energy of carriers is lost by scattering, and a width of said virtual transition area.

Furthermore, a material estimation apparatus which estimates physical properties of an object including two materials contacting each other by performing a simulation for the object, comprising:

a transition area setting part which sets a virtual transition area to a contact portion between said two materials; and a power calculation unit which calculates consumption power due to a contact resistance of said virtual transition area based on a contact resistance of said contact portion, a potential difference of said virtual transition area, and a volume of said virtual transition area.

BRIEF DESCRIPTION OF THE DRAWINGS

FIG. 2 is a diagram explaining grids set on the object.

FIG. 11 is a detailed flowchart of the processing of step S25.

FIG. 12 is a detailed flowchart of the processing of step S26.

FIG. 18 is a a conceptual drawing of the second embodiment.

FIG. 19 is a detailed flowchart showing the processing of step S29 of FIG. 10 according to second embodiment.

FIG. 20 shows a drawing showing a comparison result between the consumption power calculated by the first and second embodiments and the scattering rate of electron energy calculated by Monte-Carlo method.

FIG. 22 is a diagram explaining the other conventional method.

FIG. 23 is a diagram showing current property due to simulation by the method of FIG. 22.

DESCRIPTION OF THE PREFERRED EMBODIMENTS

Hereinafter, a material estimation apparatus, a material estimation program and a method of estimating materials will be more specifically described with reference to drawings.

Figure 1:
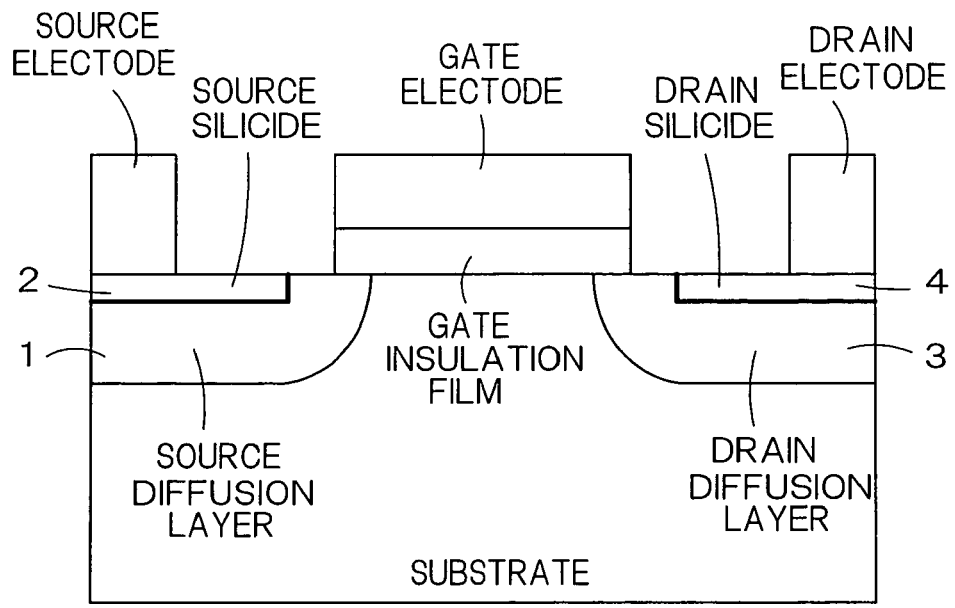
FIG. 1 is a cross section diagram of a MISFET showing one example of an object.

Hereinafter, as an example of objects, as shown in FIG. 1, simulation of MISFET having a source silicide 2 formed on a source diffusion layer 1 and a drain silicide 4 formed on a drain diffusion layer 3 will be mainly described. The objects of the present invention are not limited to the MISFET, and various objects including two materials connected to each other may be the objects of the present invention. However, the present invention is not applicable to a pn junction.

Figure 3A:
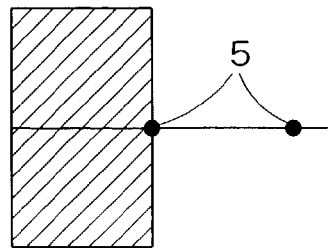
FIG. 3 is an enlarged view of an area surrounded with a circle of FIG. 2.

For example, when the simulation is performed for the MISFET of FIG. 1, as shown in FIG. 2, the MISFET is divided into grid shape, and the simulation is performed at an intersection of each grid. FIG. 3A is an enlarged view of a portion surrounded with a circle of FIG. 2. A distance between the adjacent grids 5 is called as a grid interval, and a path between the adjacent grids is called as a branch. The present invention is also applicable not only to a rectangle grid with same interval, but also to an irregular interval or a triangle grid.

Figure 3B:
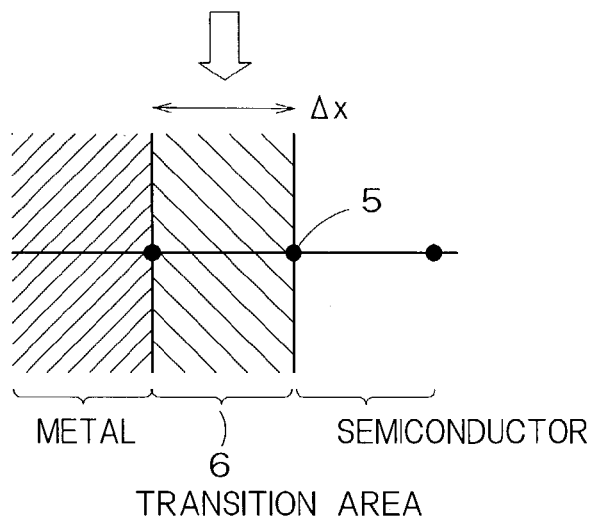

In the present invention, as shown in FIG. 3B, a transition area 6 is set to the connection portion of two materials connected to each other. Here, the transition area 6 indicates the grid interval $\Delta x$ between two materials connected to each other.

In the case of MISFET, a virtual transition area 6 is set to the contact portion between the semiconductor and the metal of MISFET, more specifically, a connection portion between the source diffusion layer 1 and the source silicide 2, and a connection portion between the drain diffusion layer 3 and the drain silicide 4.

The simulation of the objects at every grid unit in itself has been performed conventionally. The transition area 6 virtually set to the contact portion between the semiconductor and the metal of the MISFET is the same as the conventional grid interval described in FIG. 20.

Figure 4:
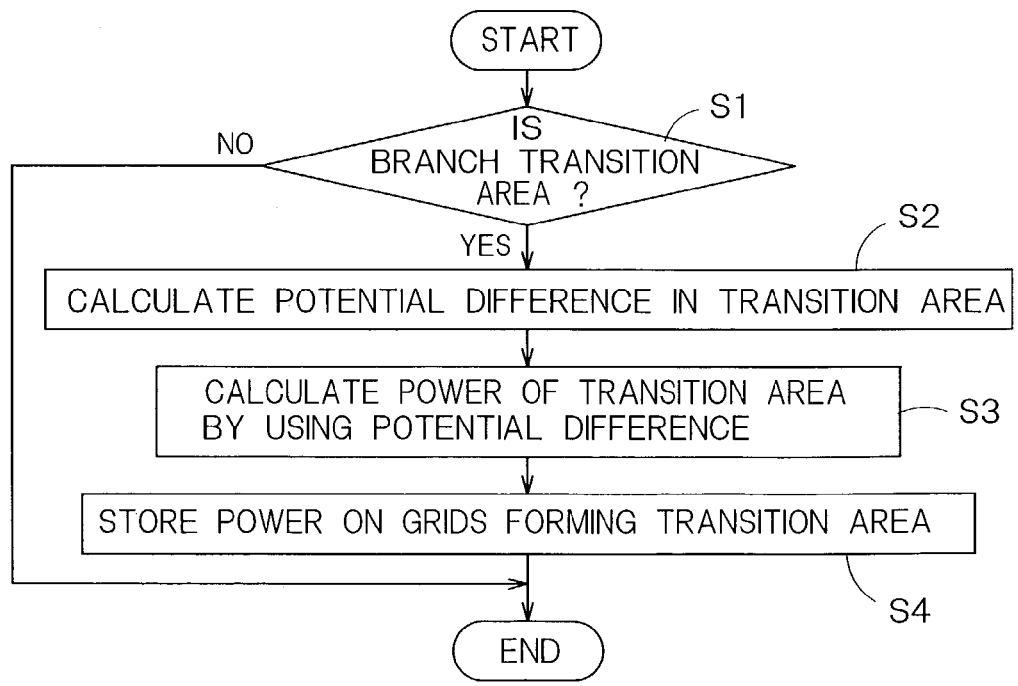
FIG. 4 is a flowchart showing a principle of the method of estimating the materials according to the present invention.

FIG. 4 is a flowchart showing a principle of the method of estimating the materials according to the present invention. Before beginning the processings of the flowchart, the grids are set on the objects. The simulation is performed by the following processings for each grid.

First of all, it is determined whether or not the branch expressing the path between the adjacent grids is the transition area 6 (step S1). If the branch is the transition area 6, a difference of potential in the transition area 6 is calculated (step S2). Here, the difference of potential in the transition area 6 occurs by a contact resistance of the transition area 6.

Next, power consumption by the contact resistance of the transition area 6 is calculated by using the calculated difference of potential (step S3). Next, the calculated power consumption is stored in accordance with the grid located at both end faces of the transition area 6 (step S4).

A heat conduction equation is solved by using the power consumption of the transition area 6 calculated by the processings of FIG. 4. Therefore, even if the grid interval set at both end faces of the transition area 6 changes, the grid temperature does not change, thereby precisely predicting tolerance due to heat of the semiconductor device.

Hereinafter, one embodiment of the material estimation apparatus according to the present invention will be described in detail.

(First Embodiment)

A first embodiment has a feature in which the power consumption due to the contact resistance of the transition area 6 is calculated while taking a characteristic length into consideration. Here, the characteristic length is a width of a depletion layer or a value in proportion to the width formed when two materials contact each other.

Figure 5:
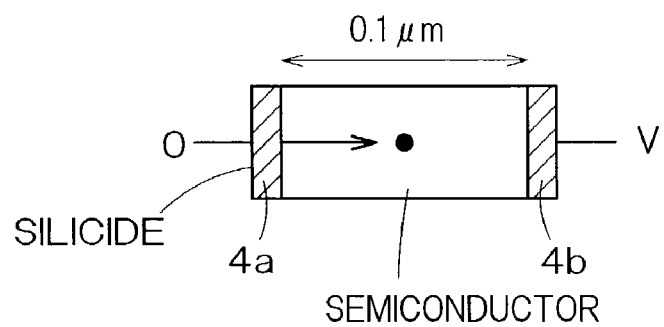
FIG. 5 shows an example in which the silicides 4a and 4b are arranged at both ends of the semiconductor of the length 0.1 μm and 1V is applied to the silicide 4b at right end.
Figure 6:
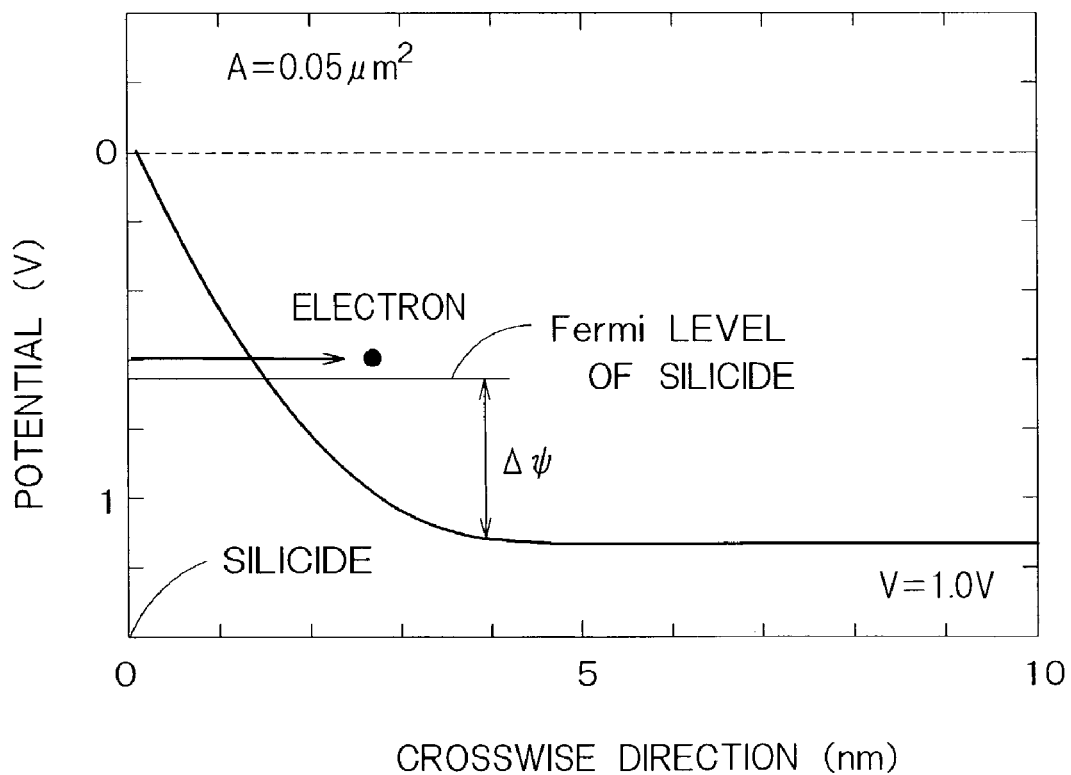
FIG. 6 is a potential view of FIG. 5.

FIG. 5 shows an example in which the silicides 4a and 4b are arranged at both ends of the semiconductor of the length 0.1 µm, 0V is applied to the silicide 4a of left end, and 1V is applied to the silicide 4b of right end. FIG. 6 is a potential view of FIG. 5. Impurity concentration of donor of the semiconductor is, for example, $10^{20}$ cm$^{-3}$.

As conceptually shown with black circles in the semiconductor of FIG. 6, the electron is injected in the semiconductor by quantum mechanics tunnel from the silicide of left end. At this time, energy obtained by the semiconductor is expressed by Δφ shown in FIG. 6. The energy transits to a grid system by phonon scattering, and the grid temperature rises so that vicinity of the contact portion comes to the state of heat generation.

Figure 7:
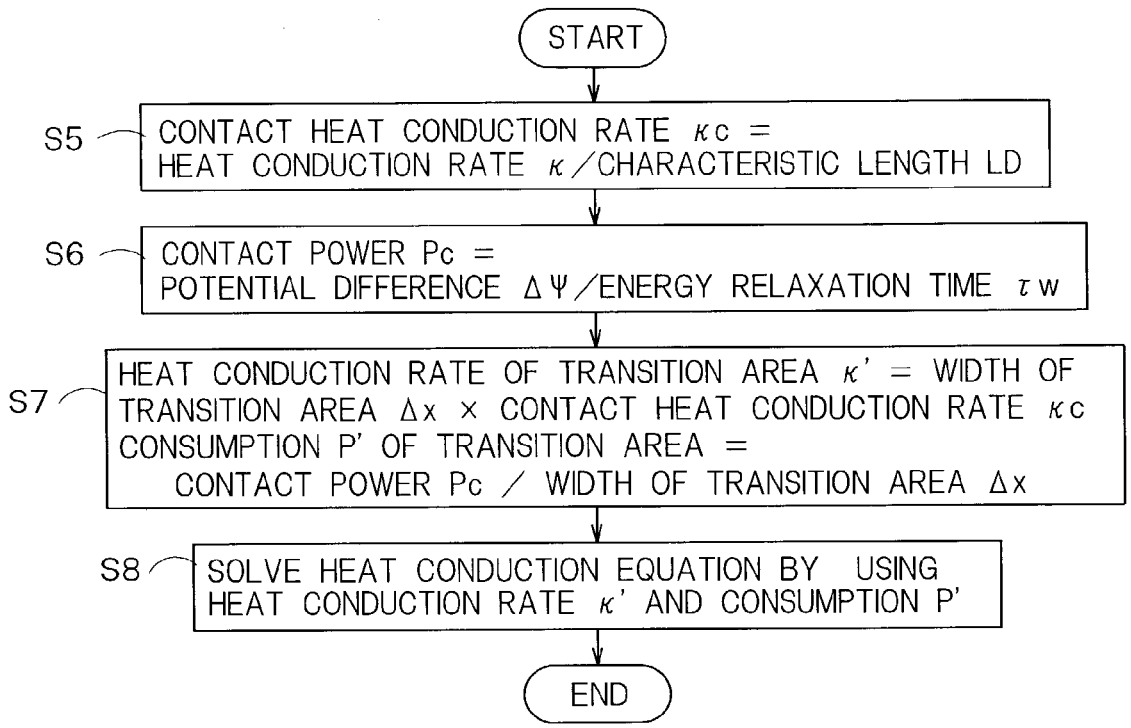
FIG. 7 is a flowchart showing principle processings of the first embodiment.

FIG. 7 is a flowchart showing principle processings of the first embodiment. In the present embodiment, the virtual transition area 6 is set between the semiconductor and the metal (silicide), and a contact heat conduction rate κc is prescribed by dividing the heat conduction rate κ by the characteristic length LD (step S5).

Next, the contact power Pc is prescribed by dividing the potential difference Δφ due to the contact resistance of the transition area 6 by an energy relaxation time τw (step S6). Here, the energy relaxation time τw expresses an average time when the energy of the carrier is lost by scattering. The contact power Pc expresses the consumption power due to the contact resistance between different materials (in the present embodiment, between the semiconductor and the metal).

Next, the heat conduct rate κ' of the transition area 6 is calculated by multiplying the width of the transition area 6, that is, the grid interval Δx by the contact heat conduction rate κ'. Furthermore, the consumption power P' due to the contact resistance of the transition area 6 is calculated by dividing the contact power Pc by the grid interval Δx (step S7).

Next, the heat conduction equation shown in equations (1) and (2) is solved by using the calculated heat conduction rate Δκ' and the consumption power P' (step S8).

$$C_L \frac{\partial T_L}{\partial t} + \nabla \cdot \vec{S} = P' \quad (1)$$

$$S_L = -\kappa \nabla T_L \quad (2)$$

Here, CL is heat capacitance, $T_L$ is grid temperature, t is time, ∇ is space differential operator, and $S_L$ is heat flow.

Next, configuration and processing operation of the first embodiment will be described in detail.

Figure 8:
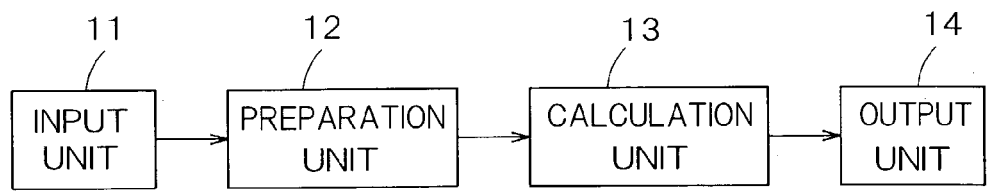
FIG. 8 is a block diagram showing schematic configuration of one embodiment of the material estimation apparatus according to the present invention.

FIG. 8 is a block diagram showing schematic configuration of one embodiment of the material estimation apparatus according to the present invention. The material estimation apparatus of FIG. 8 has an input unit 11, a preparation unit 12, a calculating part 13, and an output unit 14.

The input unit 11 imports information such as device structure indicated from users, impurity distribution and condition for applying voltage.

The preparation unit 12 performs a processing for setting grids on the simulation objects (for example, MISFET), and a processing for allocating to each grid physical quantities which do not change by bias condition such as permittivity, work function and fixed electric charge density.

The calculating part 13 estimates physical properties of the objects by solving a governing equation including the heat conduction equation. The output unit 14 outputs the calculation result by the calculating part 13 in forms such as image and numeral.

Figure 9:
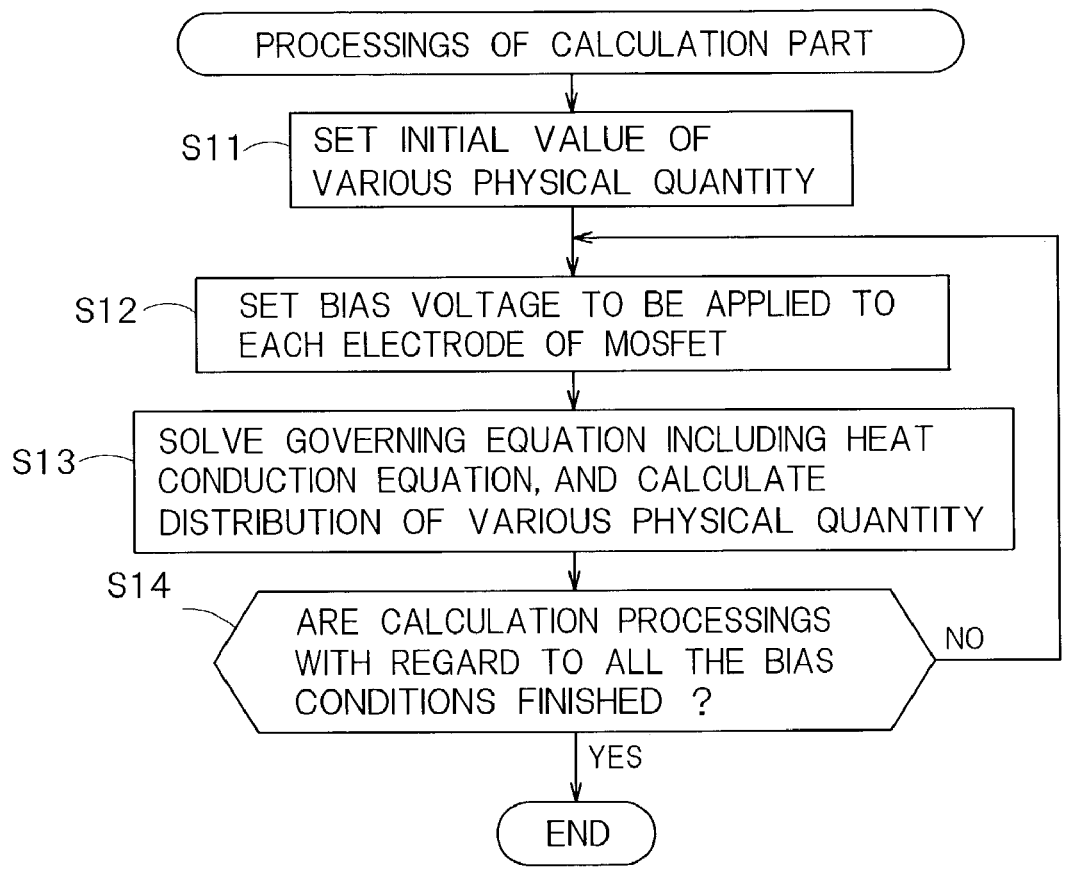
FIG. 9 is a schematic flowchart showing one example of processings of the calculating part 13.

FIG. 9 is a schematic flowchart showing one example of processings of the calculating part 13. First of all, initial values of various physical quantities are set (step S11). More specifically, carrier concentration of electron or hole is decided based on an electric charge neutral condition and a law of conservation of mass. Potential is given as pseudo Fermi level from the carrier density and Boltzman statistics, or is given based on the work function. With regard to the grid temperature, the electron temperature, the hole temperature and so on, the surrounding temperature is set to be an initial value.

Next, the bias voltage to be applied to each terminal of the MISFET being the simulation object is set (step S12). A schedule relating to how to give the bias voltage is set in advance based on the bias condition inputted by users in the input unit 11.

Next, the governing equation including the heat conduction equation is solved to calculate the distribution of various physical quantities (step S13). The processing of step S13 will be described afterwards.

Next, it is determined whether or not the calculating processing of step S13 is finished with regard to all the bias conditions (step S14). If there is any bias condition which has not yet been finished, a new bias condition is set to repeat the processings on and after step S12. When the calculation processings of step S13 is finished with regard to all the bias conditions, the calculation unit 13 sends the calculation result to the output unit 14.

Figure 10:
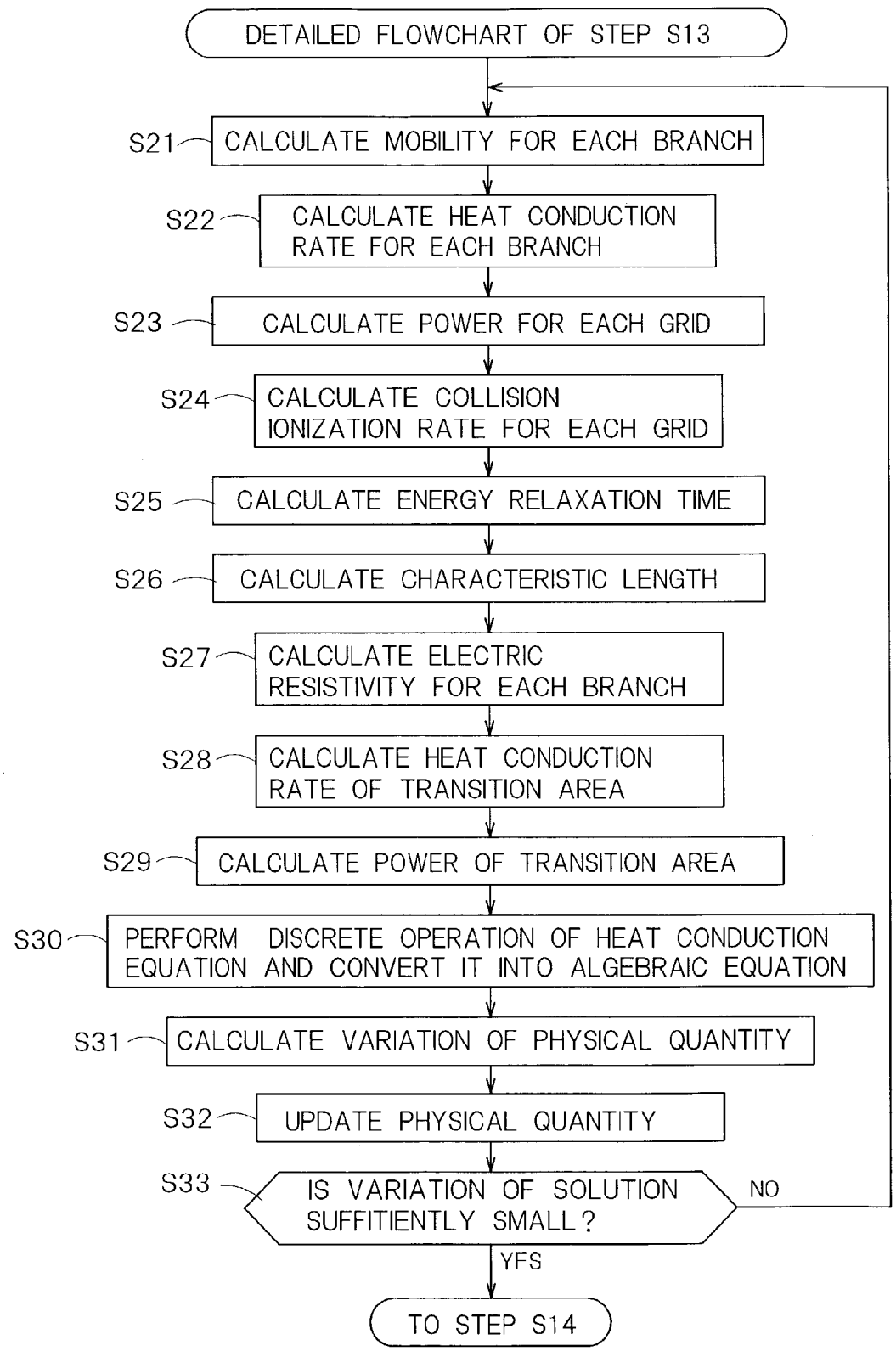
FIG. 10 is a detailed flowchart for describing in detail the processings of step S13 of FIG. 9.

FIG. 10 is a detailed flowchart explaining in detail the processings of step S13 of FIG. 9. First of all, at the state in which the MISFET of the simulation object is divided by grids, mobility is calculated for each branch between the respective grids (step S22). Next, the power is calculated for each grid (step S23). Next, confliction ionization rate is calculated for each grid (step S24).

The above steps S21–S24, are performed even in the conventional device simulation. These processing results are used when the above heat conduction equation is solved.

Next, energy relaxation time expressing average time when carrier energy is lost by scattering (step S25) is calculated. FIG. 11 is a detailed flowchart of the processing of step S25. First of all, a prescribed physical quantity on grids is referred (step S41). Here, the prescribed physical quantity is, for example, the impurity density, the carrier density, the carrier energy, and the electrical field.

Next, the energy relaxation time is calculated as a function of the referred physical quantity (step S42). Next, the energy relaxation time is stored on the grids (step S43). The processings of the above steps S41–S43 are performed for all the grids set on the MISFET of the simulation object.

After the processing of step S25 of FIG. 10 is finished, the characteristic length expressing the distance within which the carrier loses energy is calculated (step S26). Here, more specifically, the characteristic length is, for example, a width of the depletion layer by the Schottky barrier formed between the electrode and the semiconductor.

FIG. 12 is a detailed flowchart of the processing of step S26. First of all, it is determined whether or not the branch between the grids set to the MISFET sandwiches the transition area 6 (step S51). If the branch does not sandwich the transition area 6, the processings of FIG. 12 is finished. If the branch sandwiches the transition area 6, the characteristic length on the branch is calculated (step S52). Next, the calculated characteristic length is stored in accordance with the branch (step S53). The processings of the above-mentioned step S51–S53 are performed for all the grids set on the MISFET of the simulation object.

Figure 13:
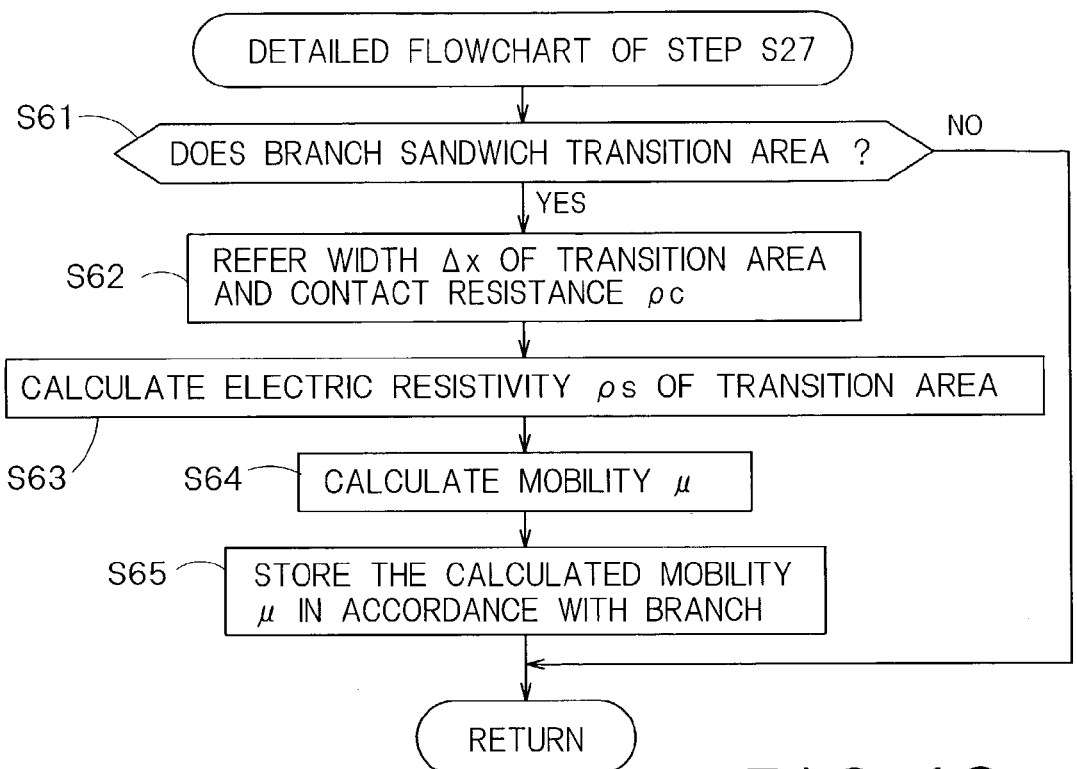
FIG. 13 is a detailed flowchart of the processing of step S27 of FIG. 10.

After the processing of step S26 of FIG. 10 is finished, the electric resistivity is calculated for each branch between the grids in the transition area 6 (step S27). FIG. 13 is a detailed flowchart of the processing of step S27 of FIG. 10. First of all, it is determined whether or not the branch between the grids sandwiches the transition area 6 (step S61). If the branch does not sandwich the transition area 6, the processing is finished. If the branch sandwiches the transition area 6, the width $\Delta x$ of the transition area 6 and the contact resistance $\rho c$ are referred (step S62). Next, the electric resistivity $\rho s$ of the transition area 6 is calculated based on equation (3) (step S63).

$$\rho s = \rho c / \Delta x \quad (3)$$

Next, the mobility $\mu$ is calculated based on equation (4) (step S64).

$$\mu = (1/q) N \rho s \quad (4)$$

Here, q is unit elementary charge, and N is impurity density or carrier density.

Next, the calculated mobility $\mu$ is stored in accordance with the corresponding branch (step S65).

The processings of the above-mentioned steps S61–S65 are performed for all the grids set on the MISFET of the simulation object.

Figure 14:
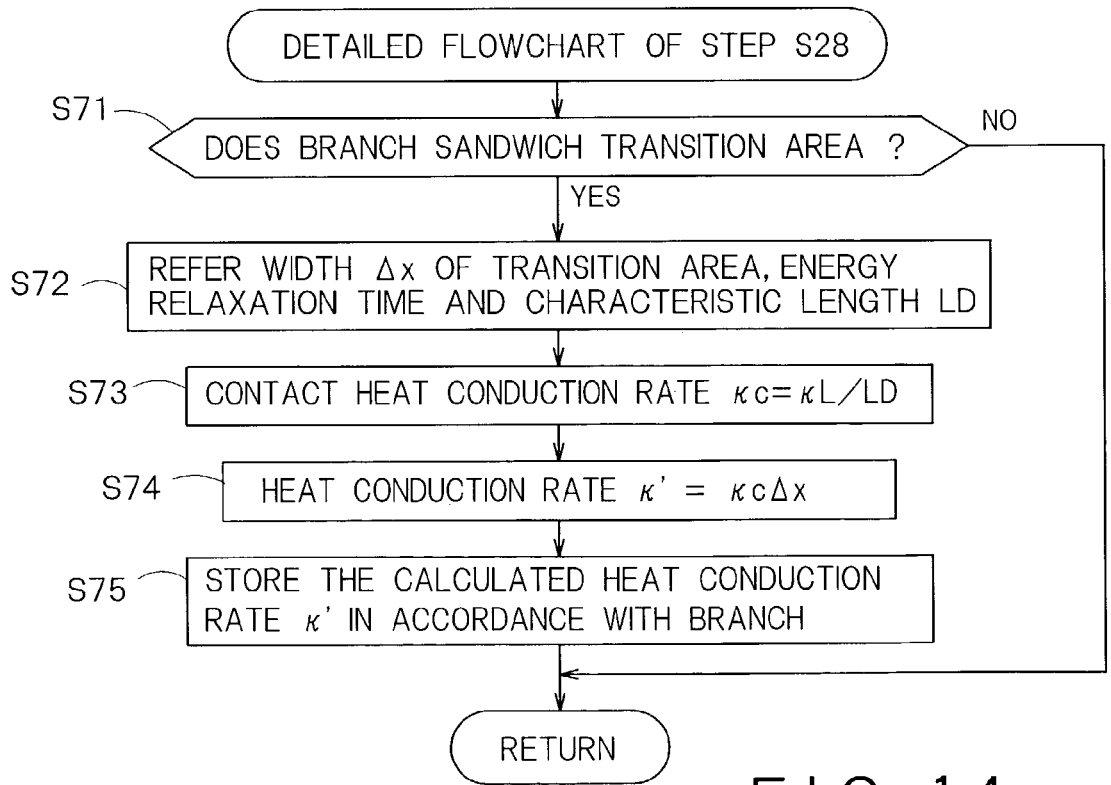
FIG. 14 is a detailed flowchart of the processing of step S28.

After the processing of step S27 of FIG. 10 is finished, the heat conduction rate of the transition area 6 is calculated (step S28). FIG. 14 is a detailed flowchart of the processing of step S28. First of all, it is determined whether or not the branch between the grids sandwiches the transition area 6 (step S71). If the branch does not sandwich the transition area, the processings of FIG. 10 is finished. If the branch sandwiches the transition area, the width $\Delta x$ of the transition area 6, the energy relaxation time and the characteristic length LD are referred (step S72). Next, The contact heat conduction rate $\kappa c$ of the transition area 6 is calculated (step S73).

$$\kappa_c = \kappa_L / L_D \quad (5)$$

Next, the heat conduction rate $\kappa'$ of the transition area 6 is calculated based on equation (6) (step S74).

$$\kappa' = \kappa_c \Delta x \quad (6)$$

Next, the calculated heat conduction rate $\kappa'$ is stored in accordance with the corresponding branch (step S75).

The processings of the above-mentioned step S71–S75 are performed for all the grids set on the MISFET of the simulation object.

Figure 15:
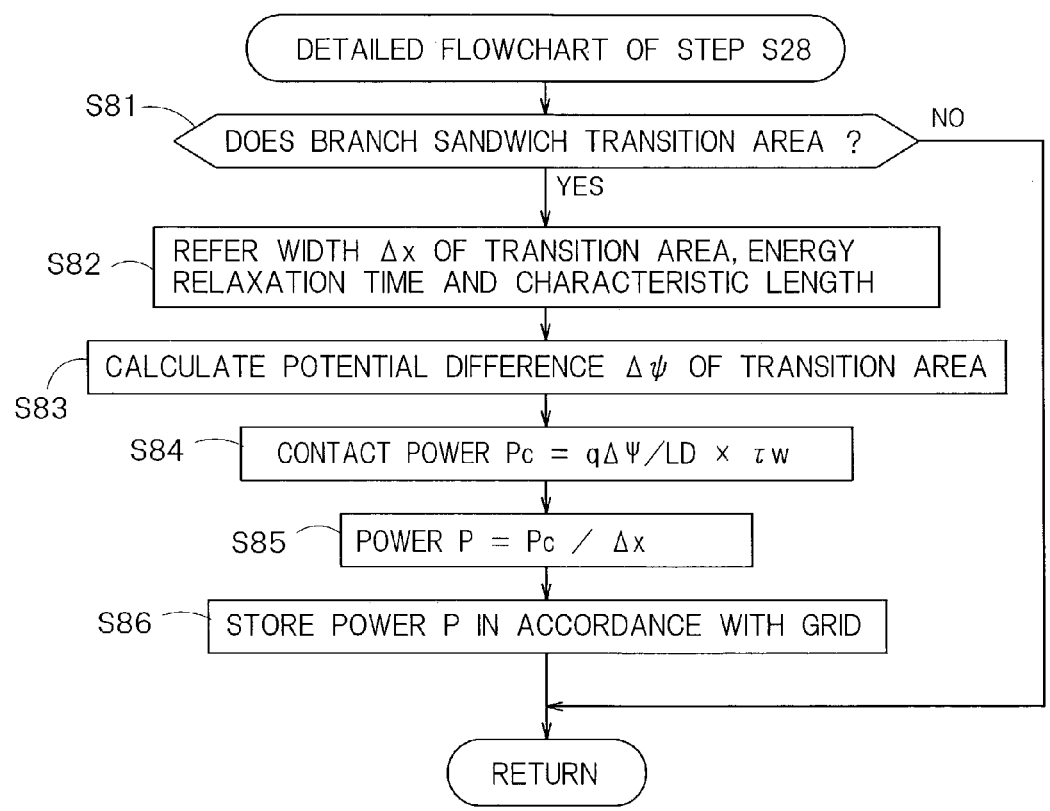
FIG. 15 is a detailed flowchart of the processing of step S29 of FIG. 10.

After the processing of step S28 of FIG. 10 is finished, the power of the transition area 6 is calculated (step S29). FIG. 15 is a detailed flowchart of the processing of step S29 of FIG. 10. First of all, it is determined whether or not the branch between the grids sandwiches the transition area 6 (step S81). If the branch does not sandwich the transition area, the processings of FIG. 15 is finished. If the branch sandwiches the transition area, the width $\Delta x$ of the transition area 6, the energy relaxation time and the characteristic length LD are referred (step S82). Next, the difference $\Delta \phi$ of potential of the transition area 6 is calculated (step S83). Next, a contact power Pc of the transition area 6 is calculated based on equation (7) (step S84).

$$Pc = q \Delta \Psi / L_D \times \tau_w \quad (7)$$

Here, the contact power is the consumption power due to the contact resistance between the different materials (in the case of the present embodiment, the contact portion between the source diffusion layer 1 and the source silicide 2, or the contact portion between the drain diffusion layer 3 and the drain silicide 4).

Next, the power P of the transition area 6 is calculated based on equation (8) (step S85).

$$P = Pc / \Delta x \quad (8)$$

Next, the power P is stored in accordance with the grids (step S86).

The processings of the above-mentioned steps S81–S86 are performed for all the grids set on the MISFET of the simulation object.

After the processing of step S29 of FIG. 10 is finished, discrete operation is performed for the heat conduction equation expressed by the above-mentioned equations (1) and (2) in order to convert the heat conduction equation into an algebraic equation (step S30).

More specifically, the discrete and linear operations are performed for the following equations (9)–(12) in order to obtain Jacobian.

$$F_\psi = \nabla \cdot \epsilon \nabla \psi + q(p - n + N_D - N_A) = 0 \quad (9)$$

$$F_n = \frac{\partial n}{\partial t} + \nabla \cdot n \vec{v}_n - GR = 0 \quad (10)$$

$$n \vec{v}_n = -\mu_n \left( -n \nabla \psi + \frac{k_B \nabla n T_n}{q} \right)$$

$$F_p = \frac{\partial p}{\partial t} + \nabla \cdot p \vec{v}_p - GR = 0 \quad (11)$$

$$p \vec{v}_p = -\mu_p \left( p \nabla \psi + \frac{k_B \nabla p T_p}{q} \right)$$

$$F_{TL} = C_L \frac{\partial T_L}{\partial t} + \nabla \cdot \vec{S}_L - P = 0 \quad (12)$$

$$S_L = -\kappa_L \nabla T_L$$

The Jacobean is described as shown in equation (13), if a determinant concerning a Poisson equation is described by using the Jacobean.

$$\begin{bmatrix} \frac{\partial F_{\psi 1}}{\partial \psi_1} & \frac{\partial F_{\psi 1}}{\partial \psi_2} & 0 & 0 \\ \frac{\partial F_{\psi 2}}{\partial \psi_1} & \frac{\partial F_{\psi 2}}{\partial \psi_2} & \frac{\partial F_{\psi 2}}{\partial \psi_3} & 0 \\ 0 & \frac{\partial F_{\psi 3}}{\partial \psi_2} & \frac{\partial F_{\psi 3}}{\partial \psi_3} & \frac{\partial F_{\psi 3}}{\partial \psi_4} \\ 0 & 0 & \frac{\partial F_{\psi 4}}{\partial \psi_3} & \frac{\partial F_{\psi 4}}{\partial \psi_4} \end{bmatrix} \begin{bmatrix} \delta \psi_1 \\ \delta \psi_2 \\ \delta \psi_3 \\ \delta \psi_4 \end{bmatrix} = \begin{bmatrix} 0 \\ 0 \\ 0 \\ 0 \end{bmatrix} \quad (13)$$

The bias setting in the above-mentioned step S12 of FIG. 9 is reflected to the above-mentioned determinant. For example, it is assumed that the potential of the electrode for setting the bias is $\psi 3$. Because the potential of the portion is not changed, the determinant is described as (14) equation.

$$\begin{bmatrix} \frac{\partial F_{\psi 1}}{\partial \psi_1} & \frac{\partial F_{\psi 1}}{\partial \psi_2} & 0 & 0 \\ \frac{\partial F_{\psi 2}}{\partial \psi_1} & \frac{\partial F_{\psi 2}}{\partial \psi_2} & \frac{\partial F_{\psi 2}}{\partial \psi_3} & 0 \\ 0 & 0 & 1 & 0 \\ 0 & 0 & \frac{\partial F_{\psi 4}}{\partial \psi_3} & \frac{\partial F_{\psi 4}}{\partial \psi_4} \end{bmatrix} \begin{bmatrix} \delta \psi_1 \\ \delta \psi_2 \\ \delta \psi_3 \\ \delta \psi_4 \end{bmatrix} = \begin{bmatrix} 0 \\ 0 \\ 0 \\ 0 \end{bmatrix} \quad (14)$$

Next, an inverse matrix of the above-mentioned determinant is calculated to calculate variation of the physical quantities (step S31). As a solution, indirect solution for calculating the inverse matrix by using incomplete LU dissolution and so on may be used, or direct solution such as gauss erase may be used. Next, various physical quantities are updated by using the variation (step S32).

Next, it is determined whether or not the variation of the solution became small sufficiently (step S33). If the variation of the solution is not yet small, the processings on and after step S21 are repeated. If the variation of the solution is small, the processings on and after step S14 is performed.

Figure 16:
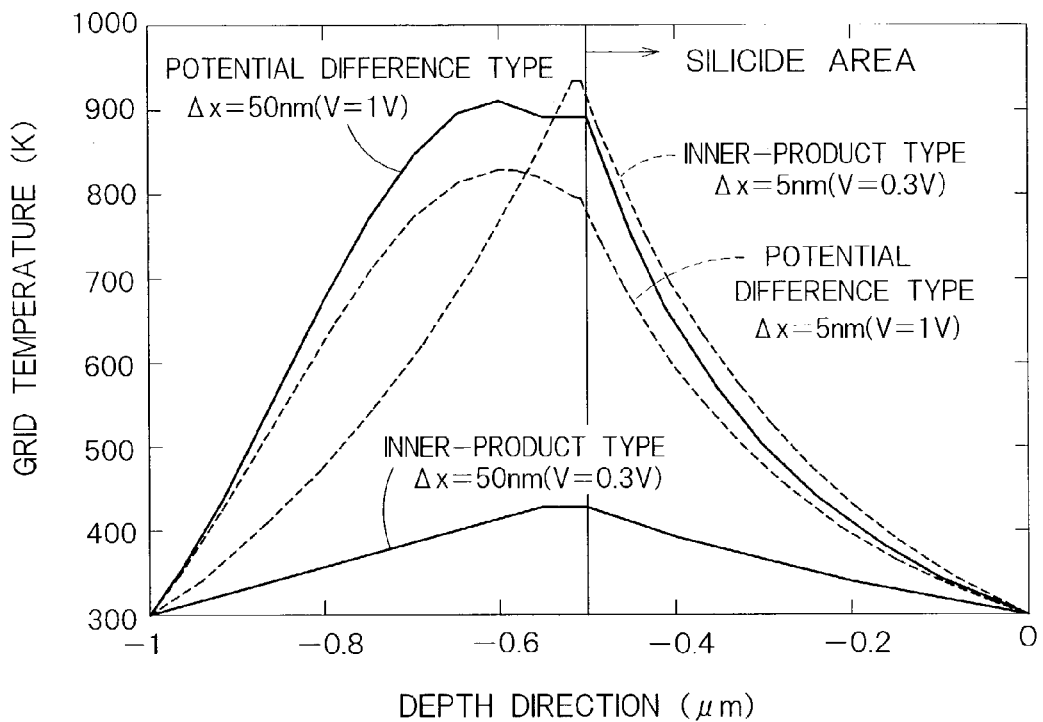
FIG. 16 is a grid temperature distribution view in a resistive element calculated by the present embodiment.

FIG. 16 is a grid temperature distribution view in a resistive element calculated by the present embodiment. In the view, the calculation result according to the present embodiment is displayed as the potential difference type, and the result according to the conventional method is displayed as inner-product type. As evident from FIG. 16, according to the present embodiment, compared with the conventional method, the dependency on the grid interval of the grid temperature is drastically reduced.

Figure 17:
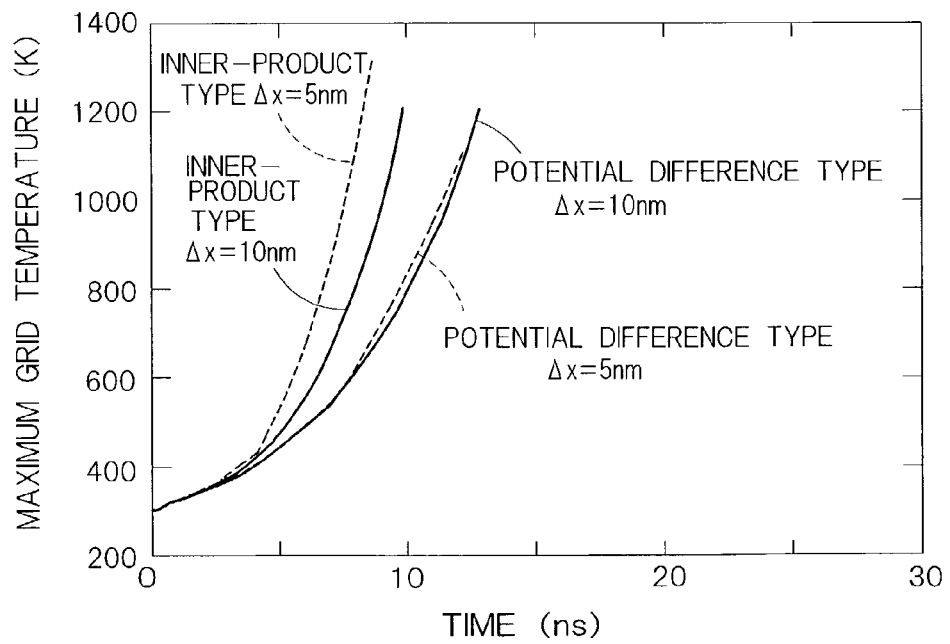
FIG. 17 is a drawing showing time variation of the maximum temperature inside the nMISFET.
Figure 21:
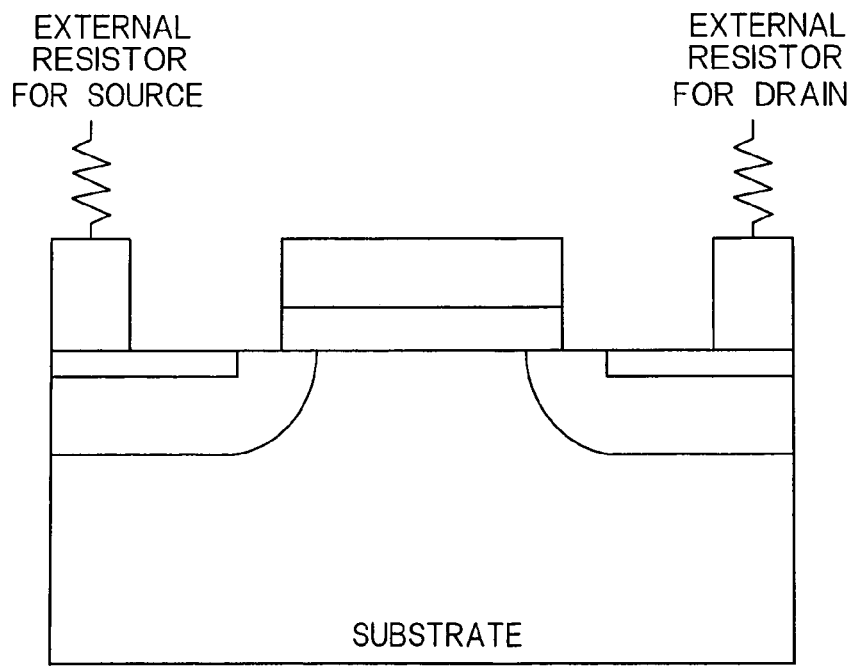
FIG. 21 is a diagram explaining the simplest conventional method taking the contact resistance into consideration.
Figure 24:
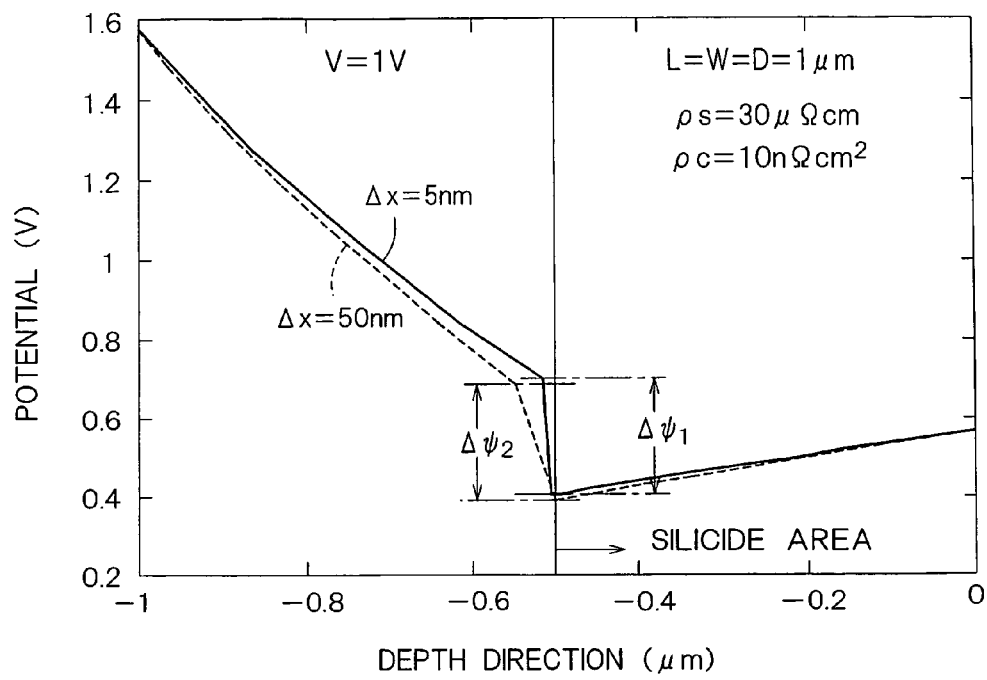
FIG. 24 is a diagram showing potential distribution due to simulation by the method of FIG. 22.
Figure 25:
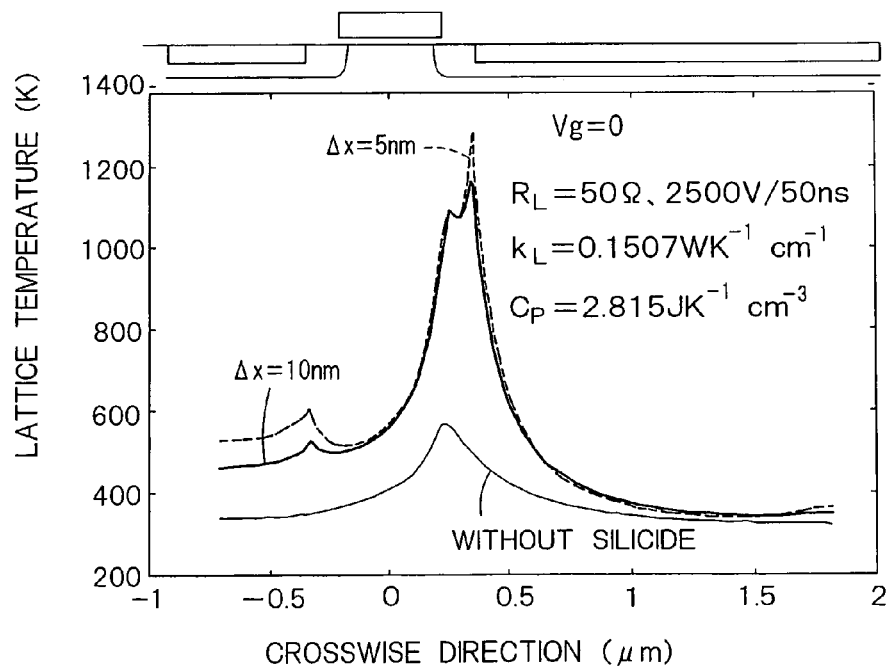
FIG. 25 is a diagram showing grid temperature distribution in substrate surface portion of MISFET.

FIG. 17 is a drawing showing time variation of the maximum temperature inside the nMISFET. Even in the drawing, the calculation result according to the present embodiment is displayed as the potential difference type, and the result according to the conventional method is displayed as inner-product type. As evident from FIG. 17, according to the present embodiment, it is possible to obtain the temperature variation which does not depend on the width of the transition area 6, that is, the grid interval.

Thus, according to the first embodiment, the virtual transition area 6 is set to the contact portion between the semiconductor and the metal, the heat conduction rate in the transition area 6 and the consumption power due to the contact resistance in the transition area 6 are calculated, and the heat conduction equation is solved by using these calculation result. Because of this, even if the grid interval set at both end faces of the transition area 6 changes, the grid temperature does not change. Accordingly, it is possible to precisely predict tolerance for the heat of the semiconductor device.

(Second Embodiment)

In a second embodiment according to the present invention, the procedure of the power calculation processings of step S29 of FIG. 10 is different from the first embodiment. Because the other processings are similar to those of the first embodiment, different matters will be mainly described hereinafter.

In the second embodiment, as shown in a conceptual drawing of FIG. 18, the power P is calculated by equation (15) by using the contact resistance ρc between the metal (silicide) and the semiconductor, and the potential difference ΔΨ due to the contact resistance ρc of the transition area 6 set virtually between the metal and the semiconductor.

$$P = S\Delta\Psi/V\rho c \quad (15)$$

Here, S is an area in which space range of the grids forming the transition area 6 is tangent, and V is a volume of the space range of the grids forming the transition area 6. The contact area ρc uses the actual measurement value, the simulation result of the Schottky junction, and the calculation result of analysis model. Here, the simulation result of the Schottky junction means that behavior of carrier for tunneling a barrier between the two materials different from each other is calculated, and the contact resistance is calculated based on current-voltage property obtained from the simulation result. Furthermore, the calculation result of the analysis model means that the simulation of the Schottky junction is simplified to analytically calculate the contact resistance.

FIG. 19 is a detailed flowchart showing the processing of step S29 of FIG. 10 according to second embodiment. First of all, it is determined whether or not the branch between the grids sandwiches the transition area 6 (step S91). If the branch does not sandwich the transition area 6, the processings of FIG. 19 is finished. If the branch sandwiches the transition area 6, the contact resistance is referred (step S92). Next, the potential difference Δψ of the transition area 6 is calculated (step S93). Next, the consumption power P due to the contact resistance of the transition area 6 is calculated based on equation (15) (step S94).

Next, the power P is stored in accordance with the grids (step S95).

The processings of the above-mentioned steps S91–S95 are performed for all the grids set on the MISFET of the simulation object.

Thus, according to the second embodiment, because the consumption power is calculated based on the above-mentioned equation (15), it is possible to calculate the consumption power more easily than the first embodiment.

FIG. 20 shows a drawing showing a comparison result between the consumption power calculated by the first and second embodiments and the scattering rate of electron energy calculated by Monte-Carlo method. According to the Monte-Carlo method, it is possible to precisely calculate speed of each electron and hole, and the physical quantity such as energy and the variation of the physical quantity. However, Monte-Carlo method requires from at least 100-fold until 1000-fold calculation time. As evident from FIG. 20, according to the first or second embodiment, it is possible to approximately reproduce the result of the Monte-Carlo method.

The material estimation apparatus described in the above-mentioned embodiments may be composed of hardware or software. When the material estimation apparatus is composed of software, a program for realizing at least a portion of functions of the material estimation apparatus may be contained in recording medium such as a flexible disc or a CD-ROM, and may be read in a computer to execute the program. The recording medium is not limited to various mediums capable of carrying, for example, a magnetic disc or an optical disc, but the recording medium may be a fixed type of recording medium such as a hard disc drive or a semiconductor memory.

The program for realizing at least a portion of functions of the material estimation apparatus may be distributed via a communication line (including a radio communication) such as an Internet. Furthermore, the program may be distributed via a wired line or a wireless line such as the Internet, or by containing in the recording medium, at the state of encoding, modulating or compressing the program.

What is claimed is:

1. A material estimation apparatus which estimates physical properties of an object including two materials contacting each other by performing a simulation for the object, comprising:
  a transition area setting unit which sets a virtual transition area to a contact portion between said two materials;
  a power calculation unit which calculates consumption power due to a contact resistance of said virtual transition area based on potential difference of said virtual transition area; and
  a grid setting unit which sets a plurality of grids, each grid expressing execution points of the simulation, to a plurality of locations of said object, respectively, and sets grids adjacent to each other at both end faces of said virtual transition area, respectively.

2. The material estimation apparatus according to claim 1, wherein said power calculation unit calculates the consumption power due to the contact resistance of said virtual transition area based on either a characteristic length expressing a width of a depletion layer or a value in proportion to a width formed when said two materials contact each other, or a volume of space range of grids expressing execution points of the simulation, each of the grids being set at both end faces of said virtual transition area.

3. A material estimation apparatus which estimates physical properties of an object including two materials contacting each other by performing a simulation for the object, comprising:
   a transition area setting unit which sets a virtual transition area to a contact portion of said two materials;
   a power calculation unit which calculates consumption power due to a contact resistance of said virtual transition area based on a potential difference due to the contact resistance of said virtual transition area, a characteristic length expressing a width of a depletion layer or a value in proportion to a width formed when said two materials contact each other, an energy relaxation time expressing an average time when energy of carriers is lost by scattering, and a width of said virtual transition area; and
   a grid setting unit which sets a plurality of grids, each grid expressing execution points of the simulation, to a plurality of locations of said object, respectively, and set grids adjacent to each other at both end faces of said virtual transition area, respectively.

4. The material estimation apparatus according to claim 3, wherein said contact portion is a contact portion between a metal and a semiconductor, or a contact portion between a silicide and the semiconductor.

5. A material estimation apparatus which estimates physical properties of an object including two materials contacting each other by performing a simulation for the object, comprising:
   a transition area setting unit which sets a virtual transition area to a contact portion of said two materials, said virtual transition area being defined by said simulation as a volume located between a pair of grids at which calculations are made by said simulation;
   a power calculation unit which calculates consumption power due to a contact resistance of said virtual transition area based on a potential difference due to the contact resistance of said virtual transition area, a characteristic length expressing a width of a depletion layer or a value in proportion to a width formed when said two materials contact each other, an energy relaxation time expressing an average time when energy of carriers is lost by scattering, and a width of said virtual transition area,
   wherein said power calculating unit includes;
   a potential difference calculation unit which calculates the potential difference due to the contact resistance of said virtual transition area;
   a first power calculation unit which calculates consumption power due to the contact resistance of said contact portion based on the calculated potential difference, said characteristic length, and said energy relaxation time; and
   a second power calculation unit which calculates the consumption power due to the contact resistance of said virtual transition area based on the consumption power calculated by said first power calculation unit and the width of said virtual transition area.

6. A material estimation apparatus which estimates physical properties of an object including two materials contacting each other by performing a simulation for the object comprising:
   a transition area setting unit which sets a virtual transition area to a contact portion of said two materials, said virtual transition area being defined by said simulation as a volume located between a pair of grids at which calculations are made by said simulation;
   a power calculation unit which calculates consumption power due to a contact resistance of said virtual transition area based on a potential difference due to the contact resistance of said virtual transition area, a characteristic length expressing a width of a depletion layer or a value in proportion to a width formed when said two materials contact each other, an energy relaxation time expressing an average time when energy of carriers is lost by scattering, and a width of said virtual transition area;
   a heat conduction rate calculation unit which calculates heat conduction rate of said virtual transition area; and
   a grid temperature calculation unit which solves a heat conduction equation based on the width of said virtual transition area, a heat conduction rate of said object, the heat conduction rate of said virtual transition area calculated by said heat conduction rate calculation unit, and the consumption power of said virtual transition area, in order to calculate grid temperature in said contact portion.

7. The material estimation apparatus according to claim 6, wherein said grid temperature calculation unit calculates said grid temperature which does not depend on the width of said virtual transition area.

8. The material estimation apparatus according to claim 6, wherein said heat conduction rate calculation unit includes:
   a first heat conduction rate calculation unit which calculates the heat conduction rate of said contact portion based on the heat conduction rate of said object and said characteristic length; and
   a second heat conduction rate calculation unit which calculates the heat conduction rate of said virtual transition area based on the heat conduction rate calculated by said first heat conduction rate calculation unit and the width of said virtual transition area.

9. A material estimation apparatus which estimates physical properties of an object including two materials contacting each other by performing a simulation for the object, comprising:
   a transition area setting unit which sets a virtual transition area to a contact portion between said two materials; and
   a power calculation unit which calculates consumption power due to a contact resistance of said virtual transition area based on a contact resistance of said contact portion, a potential difference of said virtual transition area, and a volume of said virtual transition area; and
   a grid setting unit which sets a plurality of grids, each grid expressing execution points of the simulation, to a plurality of locations of said object, respectively, and sets grids adjacent to each other at both end faces of said virtual transition area, respectively.

10. The material estimation apparatus according to claim 9, wherein said power calculation unit calculates the consumption power due to the contact resistance of said virtual transition area based on the contact resistance of said contact portion, the potential difference between grids each set at both end faces of said virtual transition area, an area in which a space range of said grids is tangent, and a volume of the space range of said grids.

11. The material estimation apparatus according to claim 9, wherein said contact portion is a contact portion between a metal and a semiconductor, or a contact portion between a silicide and the semiconductor.

12. A material estimation apparatus which estimates physical properties of an object including two materials contacting each other by performing a simulation for the object comprising:
 a transition area setting unit which sets a virtual transition area to a contact portion between said two materials;
 a power calculation unit which calculates consumption power due to a contact resistance of said virtual transition area based on a contact resistance of said contact portion, a potential difference of said virtual transition area, and a volume of said virtual transition area;
 a heat conduction rate calculation unit which calculates heat conduction rate of said virtual transition area; and
 a grid temperature calculation unit which solves a heat conduction equation based on a width of said virtual transition area, a heat conduction rate of said object, a characteristic length expressing a width of a depletion layer or a value in proportion to a width formed when said two materials contact each other, the calculated heat conduction rate and consumption power of said virtual transition area, in order to calculate grid temperature in said contact portion.

13. The material estimation apparatus according to claim 12, wherein said grid temperature calculation unit calculates said grid temperature which does not depend on the width of said virtual transition area.

14. The material estimation apparatus according to claim 12, wherein said heat conduction rate calculation unit includes: a first heat conduction rate calculation unit which calculates the heat conduction rate of said contact portion based on the heat conduction rate of said object and said characteristic length; and
 a second heat conduction rate calculation unit which calculates the heat conduction rate of said virtual transition area based on the heat conduction rate calculated by said first heat conduction rate calculation unit and the width of said virtual transition area.

15. A material estimation program which estimates physical properties of an object including two materials contacting each other by performing a simulation for the object, comprising:
 setting a virtual transition area to a contact portion of said two materials;
 calculating consumption power due to a contact resistance of said virtual transition area based on a potential difference due to a contact resistance of said virtual transition area, a characteristic length expressing a width of a depletion layer or a value in proportion to a width formed when said two materials contact each other, an energy relaxation time expressing an average time when energy of carriers is lost by scattering, and a width of said transition area; and
 setting a plurality of grids, each grid expressing execution points of the simulation, to a plurality of locations of said object, respectively, and setting arids adjacent to each other at both end faces of said virtual transition area, respectively.

16. A material estimation program which estimates physical properties of an object including two materials contacting each other by performing a simulation for the object, comprising:
 setting a virtual transition area to a contact portion between said two materials;
 calculating consumption power due to a contact resistance of said virtual transition area based on contact resistance of said contact portion, a potential difference of said virtual transition area, and a volume of said virtual transition area; and
 setting a plurality of grids, each grid expressing execution points of the simulation, to a plurality of locations of said object, respectively, and setting grids adjacent to each other at both end faces of said virtual transition area, respectively.

17. A method of estimating materials which estimates physical properties of an object including two materials contacting each other by performing a simulation for the object, comprising:
 setting a virtual transition area to a contact portion of said two materials;
 calculating consumption power due to a contact resistance of said virtual transition area based on a potential difference due to the contact resistance of said virtual transition area, a characteristic length expressing a width of a depletion layer or a value in proportion to the width formed when said two materials contact each other, an energy relaxation time expressing an average time when energy of carriers is lost by scattering, and a width of said virtual transition area; and
 setting a plurality of grids, each grid expressing execution points of the simulation, to a plurality of locations of said object, respectively, and setting grids adjacent to each other at both end faces of said virtual transition area, respectively.

18. A method of estimating materials which estimates physical properties of an object including two materials contacting each other by performing a simulation for the object, comprising:
 setting a virtual transition area to a contact portion between said two materials; calculating consumption power due to a contact resistance of said virtual transition area based on a contact resistance of said contact portion, a potential difference of said virtual transition area, and a volume of said virtual transition area; and
 setting a plurality of grids, each grid expressing execution points of the simulation, to a plurality of locations of said object, respectively, and setting grids adjacent to each other at both end faces of said virtual transition area, respectively.

* * * * *